(12) United States Patent
Tsukamoto

(10) Patent No.: US 6,509,538 B2
(45) Date of Patent: Jan. 21, 2003

(54) WIRE CUT ELECTRIC DISCHARGE MACHINE USING LINEAR MOTORS

(75) Inventor: Hideki Tsukamoto, Patumthani (TH)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/803,666

(22) Filed: Mar. 12, 2001

(65) Prior Publication Data

US 2002/0008085 A1 Jan. 24, 2002

(30) Foreign Application Priority Data

Mar. 10, 2000 (JP) ........................................ 2000-072481

(51) Int. Cl.⁷ ................................................ B23H 7/02
(52) U.S. Cl. .................................................. 219/69.12
(58) Field of Search ......................... 219/69.12; 310/12

(56) References Cited

U.S. PATENT DOCUMENTS

| | | | | |
|---|---|---|---|---|
| 4,803,326 A | * | 2/1989 | Kiyoshi .................... | 219/69.12 |
| 5,070,224 A | | 12/1991 | Töpfer et al. ............. | 219/69.12 |
| 5,606,256 A | * | 2/1997 | Takei .......................... | 310/12 |
| 5,756,953 A | | 5/1998 | Lehmann ................... | 219/69.12 |
| 6,278,076 B1 | * | 8/2001 | Gake ......................... | 219/69.12 |

FOREIGN PATENT DOCUMENTS

| | | | | |
|---|---|---|---|---|
| JP | 63-2626 A | * | 1/1988 | ............... 219/69.12 |
| JP | 2-83137 A | * | 3/1990 | |
| JP | 8-318433 | | 12/1996 | |
| JP | 11-48041 A | * | 2/1999 | |

* cited by examiner

Primary Examiner—Geoffrey S. Evans
(74) Attorney, Agent, or Firm—McDermott, Will & Emery; Paul Devinsky

(57) ABSTRACT

A wire electric discharge machine including a saddle (13) provided on a bed (1), an X axis linear motor for moving the saddle in a horizontal X axis direction, a lower arm (11), to which a lower wire guide device (8) is attached, extends in the direction of a Y axis which is orthogonal to but in the same plane as the X axis. A ram (15), to which the lower arm is attached, is provided on the saddle, having a Y axis linear motor for moving the ram in the Y axis direction. The X axis linear motor includes a row of magnets (24a) fixed to the bed and an electromagnet (24b) fixed to a lower surface of the saddle, and the Y axis linear motor comprises an electromagnet (25b) fixed to an upper surface of the saddle and a row of magnets (25a) fixed to the ram.

13 Claims, 4 Drawing Sheets

———————— when F is acting on ram 21

·················· when F is not acting on ram 21

WIRE CUT ELECTRIC DISCHARGE MACHINE USING LINEAR MOTORS

FIELD OF THE INVENTION

The present invention relates to a wire cut electric discharge machine for machining a workpiece by generating electric discharge between the workpiece and a wire electrode traveling substantially vertically between upper and lower wire guide devices. More particularly, the present invention relates to a wire cut electric discharge machine having upper and lower wire guide devices between which a wire electrode is suspended and tensioned to move horizontally relative to the workpiece using linear motors.

BACKGROUND OF THE INVENTION

Recently, sinker type electric discharge machines having a movable quill to which a tool electrode is attached and which use a linear motor to move the quill have been introduced. Use of a linear motor improves the response speed of a servo mechanism compared to the conventional combination of a rotation type servo motor and ball screw. As a result, the tool electrode moves rapidly in response to the state of a working gap formed between the tool electrode and the workpiece, enabling more stable electric discharge machining. In addition, this configuration contributes significantly to an improvement in the effects of a jump operation wherein dirty dielectric fluid entrapped in the work gap is periodically expelled as a result of rapid raising and lowering of the tool electrode, i.e., from the cavity being formed in the workpiece. As a result of the aforementioned jump operation and the high acceleration and deceleration capability of the linear motor, a deep cavity having a narrow opening can be formed in the workpiece in a shorter time and with higher precision. Also, because of the more effective jump operation, the operator is relieved of the highly skillful operation of ensuring precise flushing to maintain a continuous flow of dielectric fluid through the work gap in order to remove dirty dielectric fluid and supply fresh dielectric fluid.

Japanese laid-open patent No. 8-318433 discloses a wire electric discharge machine fitted with a linear motor. In this patent, a structure including work table having a work stand is provided on a lower saddle which is capable of movement in the direction of a horizontal Y axis. A lower saddle is provided on a bed capable of movement in the direction of the horizontal X axis which is orthogonal to the Y axis. A workpiece is mounted on the workstand, and a work tank that can store dielectric fluid is affixed on the work table. A wire electrode is vertically suspended under tension between upper and lower wire guide devices. The lower wire guide device is attached to a tip of a lower arm supported on a column. The upper wire guide device is attached to a lower end of a slider, and the slider is provided on a table which is movable in the vertical direction. The table is provided on a front surface of the upper saddle so as to be movable in the direction of a U axis which is parallel to the X axis. The upper saddle is provided on the column to be capable of movement in the direction of a V axis which is parallel to the Y axis. Movement mechanisms for the X, Y, U and V axes respectively have a built in linear motor.

SUMMARY OF THE INVENTION

An object of the present invention is to provide a wire cut electric discharge machine in which the inertial mass of a movable body that is moved by a linear motor is minimized.

Another object of the present invention is to provide a wire cut electric discharge machine capable of highly accurate positioning of upper and lower wire guide devices using a linear motor, without enlarging the size of the machine.

According to the present invention there is provided a wire electric discharge machine in which a wire electrode is suspended between upper and lower wire guide devices, the lower wire guide device being movable relative to the workpiece in a horizontal X-Y plane formed by orthogonal X and Y axes. The machine further comprises a stationary machine frame, a saddle provided on the machine frame, an X axis linear motor for moving the saddle in the X axis direction, a lower arm to which the lower wire guide device is attached, which extends in the direction of the Y axis. A ram, to which the lower arm is attached, is provided on the saddle, and has a Y axis linear motor for moving the ram in the Y axis direction. The X axis linear motor comprises a row of magnets fixed to the machine frame and an electromagnet fixed to a lower surface of the saddle, and the Y axis linear motor comprises an electromagnet fixed to an upper surface of the saddle and a row of magnets fixed to the ram.

Since the electromagnets for the linear motors have a shorter length than the row of magnets and are respectively fixed to the upper surface and lower surface of the saddle, the size and inertial mass of the saddle can be minimized.

Preferably, the centers of gravity of the electromagnet for the X axis linear motor and the electromagnet for the Y axis linear motor are aligned vertically.

Additional objects, advantages and novel features of the invention will be set forth in the description that follows, and in part will become apparent to those skilled in the art upon reading this description or practicing the invention. The objects and advantages of the invention may be realized and attained by practicing the invention as recited in the appended claims.

DESCRIPTION OF THE PREFERRED EMBODIMENTS

Figure 1:
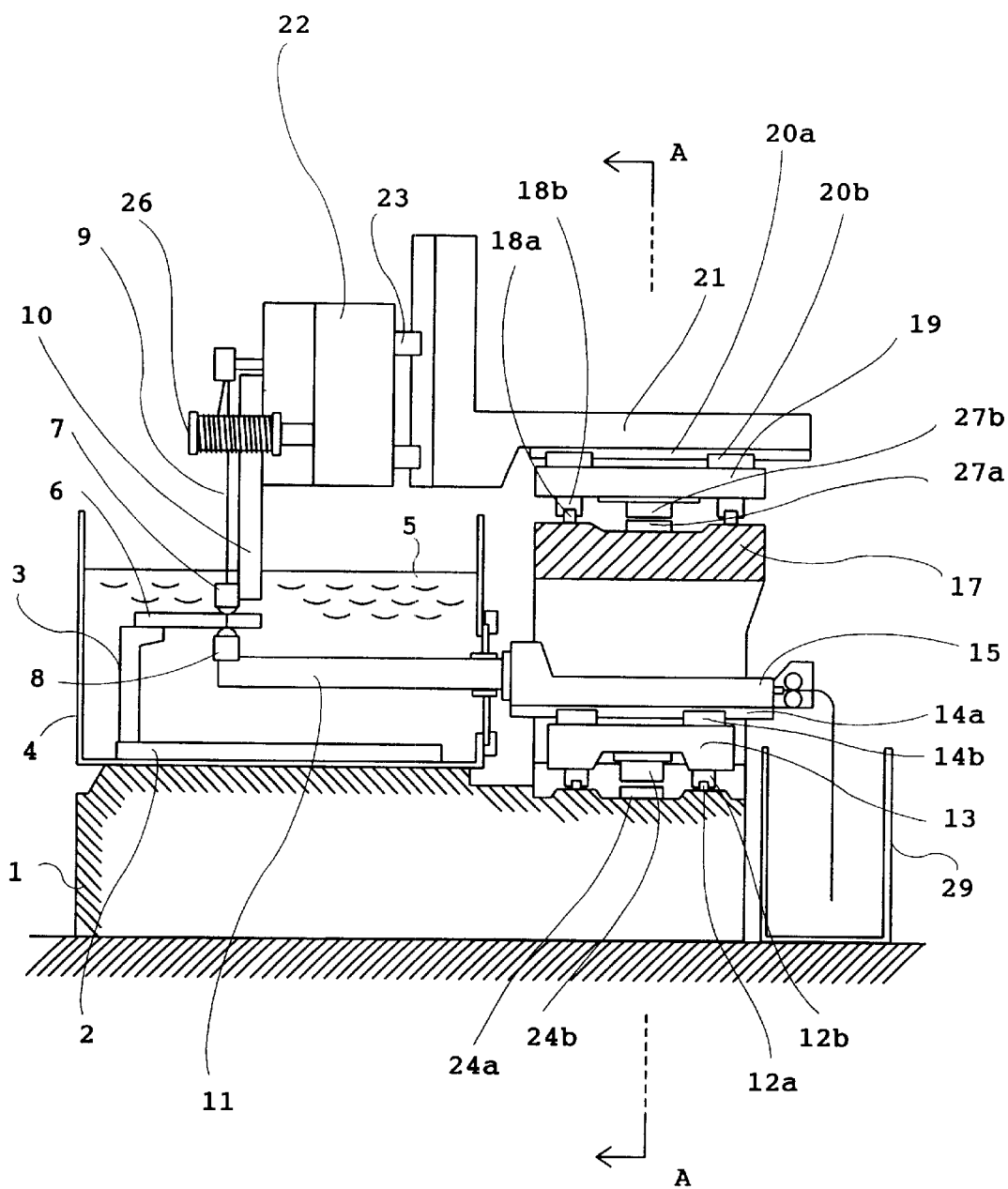
FIG. 1 is a side elevation illustrating a wire electric discharge machine of the present invention.
Figure 2:
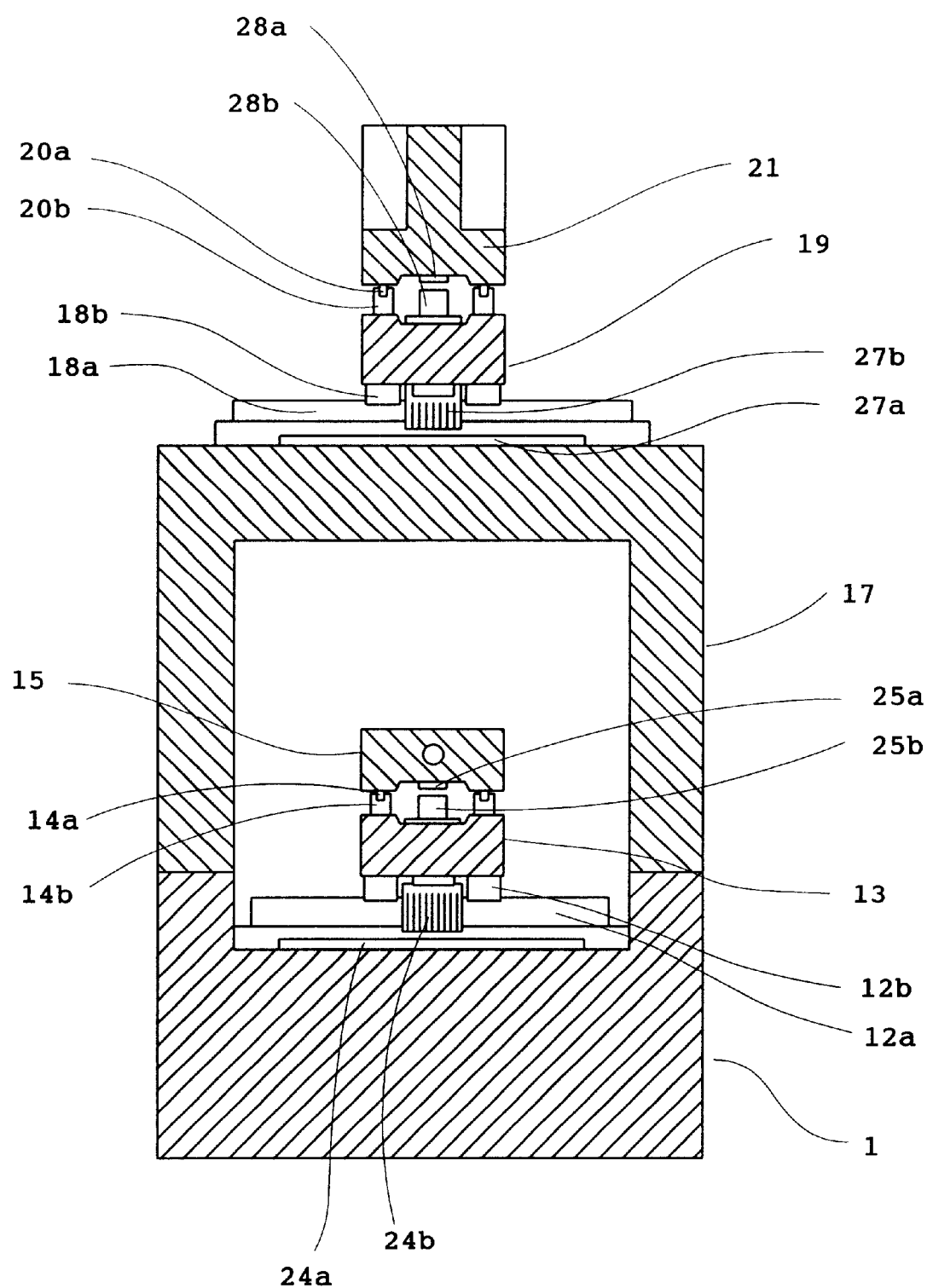
FIG. 2 is a cross sectional view of the wire electric discharge machine of FIG. 1 taken along line A—A.
Figure 3:
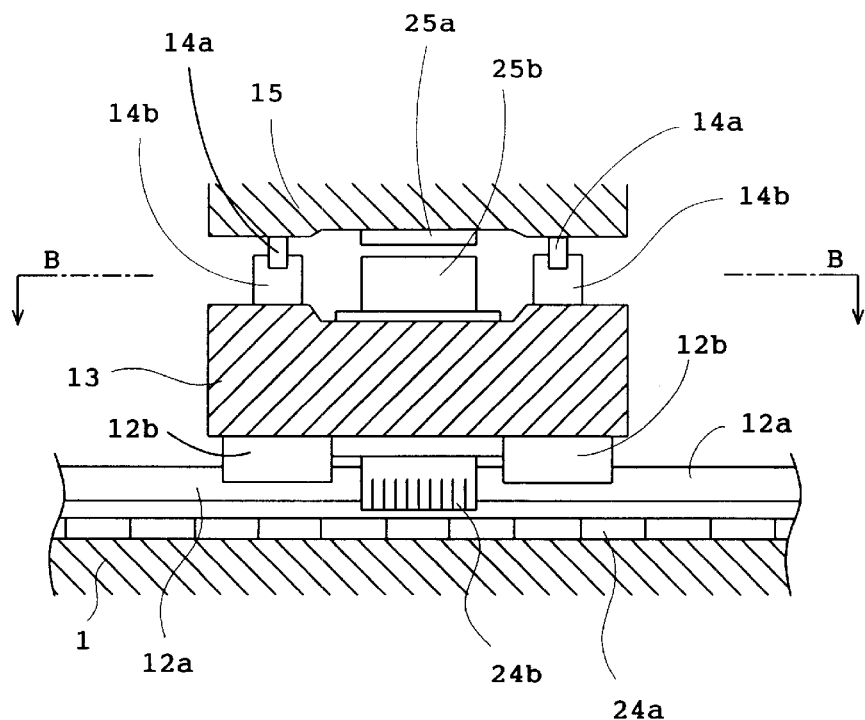
FIG. 3 is a rear view of the X-Y axis movement mechanism of FIG. 1.

A wire electric discharge machine according to the present invention will now be described with reference to FIG. 1, FIG. 2, FIG. 3 and FIG. 4.

A work tank 4 filled with dielectric fluid 5 is provided on a front part of a bed 1. A table 2, to which a work stand 3 is attached, is placed on the bottom of the work tank 4. A workpiece 6 is fixed to the work stand 3, and upper and lower wire guide devices 7 and 8 respectively, are arranged opposite each other on either side of the work piece 6. Each of the upper and lower wire guide devices 7 and 8 are attached to an end of an upper and lower arm 10 and 11, respectively. A wire electrode 9 is fed from a wire bobbin 26, through the upper wire guide device 7, the work piece 6, the lower wire guide device 8 and lower arm 11 to a bucket 29 arranged at the rear of the bed 1.

The illustrated wire electric discharge machine has an X-Y axis drive mechanism for moving the lower wire guide device 8 horizontally along the orthogonal X and Y axes, and a U-V axis drive mechanism for moving the upper wire guide device 7 along the orthogonal U and V axes. The U axis is parallel to the X axis, and the V axis is parallel to the Y axis. The X-Y axis drive mechanism essentially comprises a saddle 13, guide rails 12a, bearings 12b, a row of magnets 24a, an electromagnet 24b, a ram 15, guide rails 14a, bearings 14b, a row of magnets 25a and an electromagnet 25b. The saddle 13 is provided on the bed 1 behind the work tank 4 so as to be capable of movement in the direction of the X axis. The row of magnets 24a constitute the stator of a linear motor for moving the saddle 13 in the direction of the X axis, while the electromagnet 24b constitutes the mover. The combination of the guide rails 12a and the row of magnets 24a are attached to the bed 1, while four bearings 12b engaging the guide rails 12a, and the electromagnet 24b are attached to a lower surface of the saddle 13. A ram 15 is provided on the saddle 13 so as to be capable of movement in the direction of the Y axis. The row of magnets 25a constitute a mover of a linear motor for moving the ram 15 in the direction of the Y axis, and the electromagnet 25b constitute the stator.

The four bearings 14b engage the guide rails 14a, and the electromagnet 25b is attached to an upper surface of the saddle 13. The combination of the guide rails 14a and the row of magnets 25a are attached to a lower surface of the ram 15. The lower arm 11 passes through the work tank 4, extends horizontally and connects to a front surface of the ram 15. A bridge shaped column 17, having a bridging section extending horizontally, is provided on a rear section of the bed 1 so as to cover the X-Y axis drive mechanism. The bridge shaped column 17 and the bed 1 constitute a stationary machine frame for the wire cut electric discharge machine. The U-V axis drive mechanism is made up of a saddle 19, guide rails 18a, bearings 18b, a row of magnets 27a, an electromagnet 27b, a ram 21, guide rails 20a, bearings 20b, a row of magnets 28a and an electromagnet 28b. The saddle 19 is provided on an upper surface of the bridging section of the bridge shaped column 17, so as to be capable of movement in the direction of the U axis. The row of magnets 27a constitute the stator of a linear motor for moving the saddle 19 in the direction of the U axis, while the electromagnet 27b constitutes the mover. The combination of the guide rails 18a and the row of magnets 27a are attached to the upper surface of the bridging section of the bridge shaped column 17, while the four bearings 18b engage the guide rails 18a, and the electromagnets 27b are attached to a lower surface of the saddle 19. The row of magnets 28a constitute the mover of a linear motor for moving the ram 21 in the direction of the V axis, and the electromagnet 28b constitutes the stator. Four bearings 20b engage the guide rails 20a, and the electromagnet 28b is attached to an upper surface of the saddle 19. A combination of the guide rails 20a and the row of magnets 28a are attached to a lower surface of the ram 21. A head 22 is attached to a front surface of the ram 21 using a linear motion bearings 23. The head 22 is capable of movement in the direction of a Z axis perpendicular to the U-V plane. The position in the Z axis direction of the upper wire guide device 7 may be adjusted according to the thickness of the workpiece. The upper arm 10 and the wire bobbin 26 are attached to a front surface of the head 22.

The X-Y plane, formed by the X axis and the Y axis, and a U-V plane, formed by the U axis, and the V axis are parallel to each other, the Z axis being perpendicular to both of these planes. In the case of a straight cut, movement within the X-Y plane and movement within the U-V plane are simultaneously controlled so that the wire electrode 9 is vertically suspended between the upper and lower wire guide devices 7 and 8. In cases where a taper cut is desired, movement within the X-Y plane and movement within the U-V plane are controlled so that the position of the upper wire guide device 7 is vertically offset from the position of the lower wire guide device 8.

In one embodiment of the present invention, a high-thrust, linear, synchronous motor is used. The rows of magnets 24a, 25a, 27a and 28a are formed, for example, by fixing a plurality of permanent magnets which collectively constitute a field system, to a long steel plate in a single line. The lengths of the rows of magnets 24a, 25a, 27a and 28a depend on the desired travel in the X axis, Y axis, U axis and V axis directions.

The electromagnets 24b, 25b, 27b and 28b are formed by winding exciting coils around cores preferably made of laminated silicon steel. The length of the electromagnet is much smaller than the row of magnets. The row of magnets and the electromagnet are arranged so as to maintain an air gap of a specified size.

Figure 4:
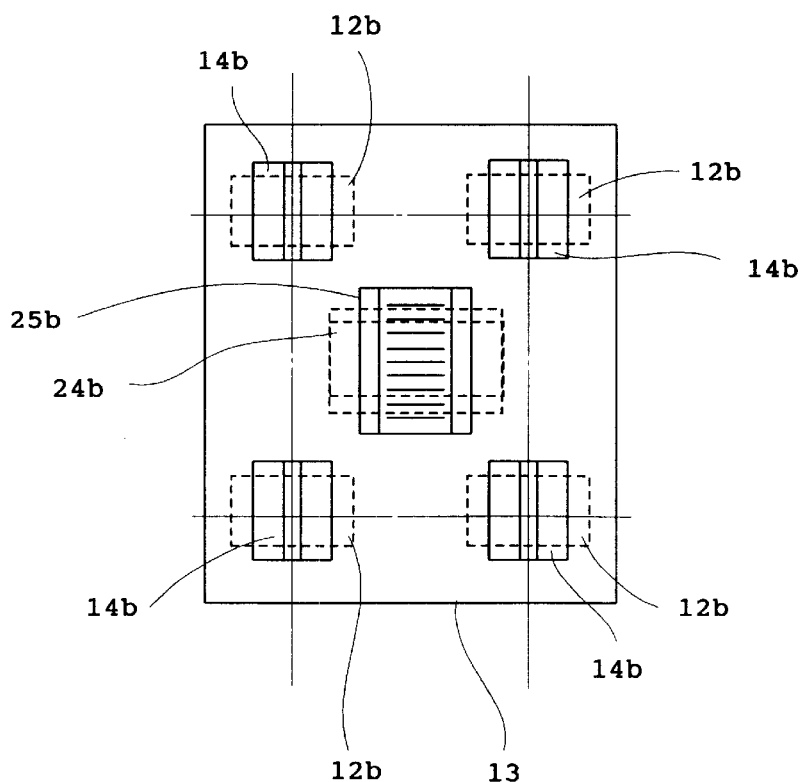
FIG. 4 is a plan view of the X-Y axis movement mechanism of FIG. 3 looking along line B—B.

As best seen in FIG. 4, the electromagnets 25b and 24b are fixed to upper and lower surfaces of the saddle 13 so that centers of gravity of the electromagnet 28b, the saddle 13 and the electromagnet 24b are vertically aligned. Accordingly, a magnetic attraction force generated between the row of magnets 25a and the electromagnet 25b, and a magnetic attraction force generated between the row of magnets 24a and the electromagnet 24b cancel each other out. Though the magnetic attraction force generated may be several times larger than the thrust, deformation of the saddle 13 is effectively prevented because the magnetic attraction forces cancel out.

Similarly, the electromagnets 28b and 27b are fixed to upper and lower surfaces of the saddle 19 so that centers of gravity of the electromagnet 27b, the saddle 19 and the electromagnet 27b are vertically aligned. In this way, deformation of the saddle 19 by magnetic attraction forces is effectively prevented.

Bearings 12b, 14b, 18b and 20b respectively have balls or rollers built in. As best seen in FIG. 4, the bearings 12b are positioned in the four corners of the lower surface of the saddle 13 at equal distances from the electromagnet 24b. The bearings 14b are also positioned in the four corners of the upper surface of the saddle 13 at equal distances from the electromagnet 25b. The layout of the bearings 12b and the layout of the bearings 14b are substantially symmetrical about the saddle 13, and the respective centers of gravity of the opposed bearings 12b and the bearings 14b are vertically aligned. Accordingly, support reaction forces of the bearings 12b and 14b cancel each other out, effectively preventing development of a bending moment in the saddle 13. Similarly, the bearings 18b and 20b are positioned at equal distances from the electromagnet 27b and 28b. The layout of the bearings 18b and the layout of the bearings 20b are also substantially symmetrical about the saddle 19, and the respective centers of gravity of the opposed bearings 18b and the bearings 20b are preferably vertically aligned. Accordingly, support reaction forces of the bearings 18b and 20b also cancel each other out, effectively preventing any bending moment in the saddle 19.

As detailed above, electromagnets 24b, 25b, 27b and 28b, having lengths shorter than opposed rows of magnets 24a, 25a, 27a and 28a, are attached to the saddle 13 or the saddle 19. Instead of guide rails, bearings are fixed to the saddle 13 and the saddle 19. In this way, the size and inertial mass of the saddles 13 and 19 are minimized. As a result, the required thrust is minimized, obviating the need for excessively large linear motors for the X axis and U axis.

Figure 5:
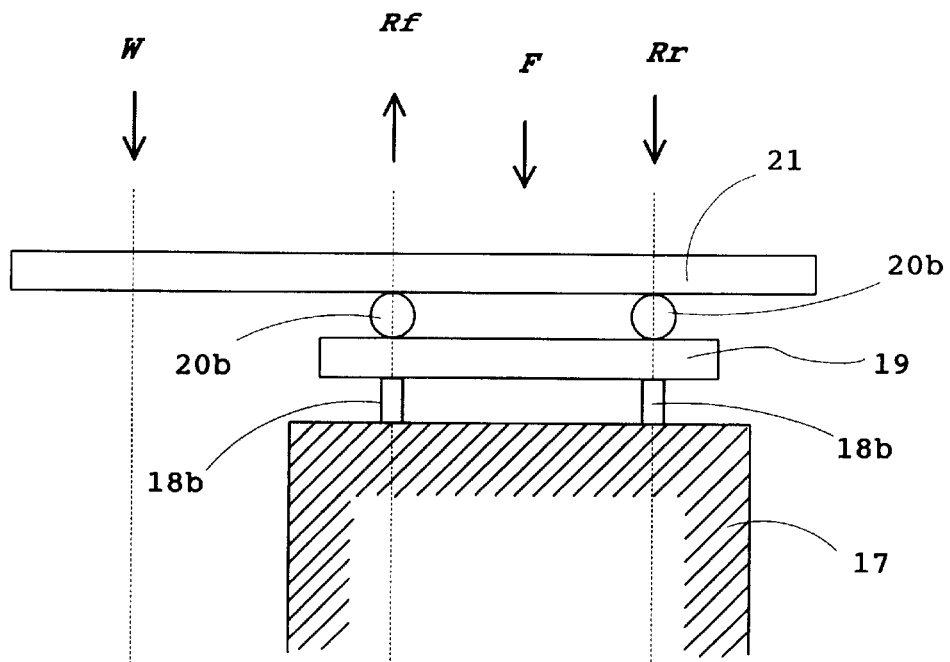
FIG. 5 is a drawing illustrating a load acting on a ram of the U-V axis movement mechanism of FIG. 1.

The ram 21, which operates by a magnetic attraction force, will now be described in detail with reference to FIG. 5 and FIG. 6.

The ram 21 is supported at two points along the V axis by front and rear bearing 20b. The head 22 is attached to a front surface of the ram 21, and the weight w of the head 22 at the foremost part of the ram 21 is shown in FIG. 5. A vertical drag Rf acts at the position of the front bearing 20b, and vertical drag Rr acts at the position of the rear bearing 20b. A magnetic attraction force generated between the row of magnets 28a and the electromagnet 28b acts on the ram 21. For simplification, in FIG. 5, a magnetic attraction force F is shown as a concentrated load, and the weight of the ram 21 is not taken into consideration.

Figure 6:
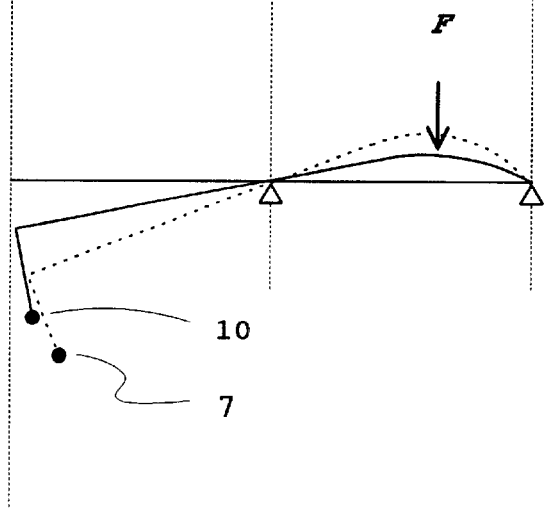
FIG. 6 is a schematic drawing depicting the flexing of the ram of the U-V axis movement mechanism of FIG. 1.

In FIG. 6, a dotted line represents deformation of the ram 21 when the magnetic attraction force F is not acting on the ram 21. The solid line represents deformation of the ram 21 when the magnetic attraction force F is acting on the ram 21. As shown in FIG. 6, the bending moment acting on the ram 21 between the front and rear bearings 20b is decreased by the magnetic attraction force F. As a result, it is possible to position the upper wire guide device 7 with high precision.

The foregoing description of preferred embodiments of the invention have been presented for purposes of illustration and description. It is not intended to be exhaustive or to limit the invention to the precise form enclosed, and obviously many modifications and variations are possible in light of the above teaching. For example, in the embodiment a stationary machine frame is constructed using a bed 1 and a bridge shaped column 17, but it is possible to adopt other machine fames capable of providing respective horizontal planar surfaces to the X-Y axis drive mechanism and the 0 axis drive mechanism. It is intended that the scope of the invention, not be limited by any details of the preferred embodiments, but that it be defined by solely the claims appended hereto.

What is claimed is:

1. A wire-cut electric discharge machine in which a wire electrode is suspended between upper and lower wire guide devices, the lower wire guide device being movable relative to the workpiece in a horizontal X-Y plane formed by orthogonal X and Y axes, comprising:

a stationary machine frame;

a saddle provided on the machine frame;

an X axis linear motor for moving the saddle in the X axis direction;

a lower arm, extending in the direction of the Y axis the lower wire guide device being attached to the lower arm;

a ram, positioned on the saddle, the lower arm being attached to the ram;

a Y axis linear motor for moving the ram in the Y axis direction; and wherein the X axis linear motor comprises a row of magnets fixed to the machine frame and an electromagnet fixed to a lower surface of the saddle, and the Y axis linear motor comprises an electromagnet fixed to an upper surface of the saddle and a row of magnets fixed to the ram.

2. The wire cut electric discharge machine according to claim 1, wherein the centers of gravity of the electromagnet for the X axis linear motor and the electromagnet for the Y axis linear motor are essentially vertically aligned.

3. The wire cut electric discharge machine according to claim 1, wherein the machine frame comprises a bed.

4. The wire cut electric discharge machine according to claim 1, further comprising X axis guide rails attached on the machine frame and extending in the X axis direction; X axis bearings attached to a lower surface of the saddle and engaging X axis guide rails; Y axis guide rails attached to a lower surface of the ram and extending in the Y axis direction; and Y axis bearings attached to an upper surface of the saddle and engaging the Y axis guide rails.

5. The wire cut electric discharge machine according to claim 4, wherein centers of gravity of the opposed X axis bearings and the Y axis bearings are essentially vertically aligned.

6. The wire cut electric discharge machine according to claim 4, wherein the Y axis bearings are positioned at equal distance from the electromagnet for the Y axis linear motor.

7. A wire cut electric discharge machine in which a wire electrode is suspended between upper and lower wire guide devices, the upper wire guide device being movable relative to the workpiece in a horizontal U-V plane formed by orthogonal U and V axes, said electric discharge machine comprising:

a stationary machine frame;

a saddle provided on the machine frame;

an U axis linear motor for moving the saddle in the U axis direction;

a ram positioned on the saddle;

an upper arm, the upper wire guide device being attached to the upper arm;

a head attached to the ram, the upper arm being attached to the head; and a V axis linear motor for moving the ram in the V axis direction;

wherein the U axis linear motor comprises a row of magnets fixed to the machine frame and an electromagnet fixed to a lower surface of the saddle, and the V axis linear motor comprises an electromagnet fixed to an upper surface of the saddle and a row of magnets fixed to the ram.

8. The wire-cut electric discharge machine according to claim 7, wherein the machine frame comprises a bridge shaped column.

9. The wire-cut electric discharge machine according to claim 7, wherein the head is movable in a Z axis direction, perpendicular to a plane defined by the U axis and the V axis.

10. The wire cut electric discharge machine according to claim 7, further comprising U axis guide rails attached on the machine frame and extending in the U axis direction; U axis bearings attached to a lower surface of the saddle and engaging the U axis guide rails; V axis guide rails attached to a lower surface of the ram and extending in the V axis direction; and V axis bearings attached to an upper surface of the saddle and engaging the V axis guide rails.

11. The wire cut electric discharge machine according to claim 10, wherein centers of gravity of the opposed U axis bearings and the V axis bearings are essentially vertically aligned.

12. The wire cut electric discharge machine according to claim 10, wherein the V axis bearings are positioned at equal distance from the electromagnet for the V axis linear motor.

13. The wire-cut electric discharge machine according to claim 7, wherein the centers of gravity of the electromagnet for the U axis linear motor and the electromagnet for the V axis linear motor are essentially vertically aligned.

* * * * *